(12) United States Patent
Katayama (10) Patent No.: US 12,435,620 B1
(45) Date of Patent: Oct. 7, 2025

(54) DOGLEG SEVERITY ESTIMATION VIA COLLAR MAGNETIC FIELD MEASUREMENTS

(71) Applicant: Schlumberger Technology Corporation, Sugar Land, TX (US)

(72) Inventor: Makito Katayama, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/897,057

(22) Filed: Sep. 26, 2024

(51) Int. Cl.
*E21B 47/0228* (2012.01)
*E21B 47/024* (2006.01)

(52) U.S. Cl.
CPC ........ *E21B 47/0228* (2020.05); *E21B 47/024* (2013.01)

(58) Field of Classification Search
CPC .................. E21B 47/0228; E21B 47/024
See application file for complete search history.

(56) References Cited

U.S. PATENT DOCUMENTS

| | | | | |
|---|---|---|---|---|
| 9,464,482 B1* | 10/2016 | Bargach | ............... | E21B 44/005 |
| 9,650,834 B1* | 5/2017 | Bargach | ................. | E21B 7/067 |
| 9,657,561 B1* | 5/2017 | Bargach | ............... | E21B 47/022 |
| 2002/0185315 A1* | 12/2002 | McLoughlin | ......... | E21B 47/024 |
| | | | | 175/325.1 |
| 2010/0096186 A1* | 4/2010 | Ekseth | ................. | E21B 47/022 |
| | | | | 702/9 |
| 2014/0284103 A1* | 9/2014 | Niina | ...................... | E21B 7/068 |
| | | | | 175/45 |
| 2014/0374159 A1* | 12/2014 | McElhinney | ....... | E21B 47/0228 |
| | | | | 175/45 |
| 2018/0363445 A1* | 12/2018 | Ledroz | ................... | G01V 1/282 |
| 2018/0364389 A1* | 12/2018 | Ledroz | .................... | G01V 3/08 |
| 2019/0169979 A1* | 6/2019 | Nguyen | .................. | G01C 1/00 |
| 2022/0127951 A1* | 4/2022 | Sun | .......................... | E21B 7/04 |

* cited by examiner

*Primary Examiner* — Shane Bomar (57) ABSTRACT

A method for estimating dogleg severity includes rotating the downhole tool in a wellbore. The downhole tool includes a roll stabilized sensor housing deployed in a rotating collar. The collar includes at least first and second magnets deployed thereon. Cross-axial magnetic field measurements are made using a magnetic field sensor deployed in the sensor housing while the collar rotates. A distortion is identified in the magnetic field measurements. The dogleg severity is estimated from the distortion.

20 Claims, 7 Drawing Sheets

DOGLEG SEVERITY ESTIMATION VIA COLLAR MAGNETIC FIELD MEASUREMENTS

BACKGROUND

The use of automated drilling methods is becoming increasingly common in drilling subterranean wellbores. Such methods may be employed, for example, to control the direction of drilling based on various downhole feedback measurements, such as inclination and azimuth measurements made while drilling or logging while drilling measurements.

These automated methods may be enhanced by measurements of various wellbore properties while drilling. For example, certain automated drilling models make use of the dogleg severity (DLS) of the wellbore. DLS may be measured, for example, via the use of axially spaced apart accelerometer or magnetometer sets in the drill string. DLS may also be measured via the use of single sensor, for example, by making multiple inclination and/or azimuth measurements along the length of a wellbore. Such single sensor measurements require depth information (e.g., the measurement depth for each of the measurements) or an average rate of penetration (ROP) and the time interval between measurements. However, the depth and ROP are not readily available downhole.

There is a need in the industry for improved methods for making downhole DLS measurements, and in particular, methods that do not require a-priori knowledge of the measured depth in the wellbore or the rate of penetration while drilling.

SUMMARY

A method for estimating a dogleg severity of a downhole tool is disclosed. The method includes rotating the downhole tool in a wellbore, the downhole tool including a roll stabilized sensor housing deployed in a rotating collar. The sensor housing includes a magnetic field sensor deployed therein. The collar includes at least first and second magnets deployed thereon. The magnetic field sensor makes cross-axial magnetic field measurements while the collar rotates. A distortion is identified in the magnetic field measurements and the dogleg severity is estimated from the distortion.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Systems and methods are disclosed for making dogleg severity measurements in a wellbore. In one example embodiment, a method may include rotating a downhole tool in a wellbore. The downhole tool may include a roll stabilized sensor housing deployed in a rotating collar. The sensor housing may include a magnetic field sensor deployed therein and the collar may include at least first and second magnets deployed thereon. Cross-axial magnetic field measurements are made using the magnetic field sensor while the drill collar rotates. The magnetic field measurements may be transformed into a frequency domain. A first amplitude of a first peak in the transformed magnetic field measurements may be extracted, in which the first peak is located at a frequency equal to a rotational frequency of the rotating collar. A second amplitude of a second peak in the transformed magnetic field measurements may also be extracted, in which the second peak is located at a frequency equal to three times the rotational frequency of the rotating collar. A ratio of the second amplitude to the first amplitude may be computed and a distance between a center position of the roll stabilized housing and a center position of the collar may be estimated from the ratio. In example embodiments, a radius of curvature of the collar may be estimated from the estimated distance. In other example embodiments, the method may further include extracting first and second phases primary and secondary sinusoidal signals corresponding to the first and second peaks and estimating a direction of the dogleg severity from the extracted phases.

Figure 1:
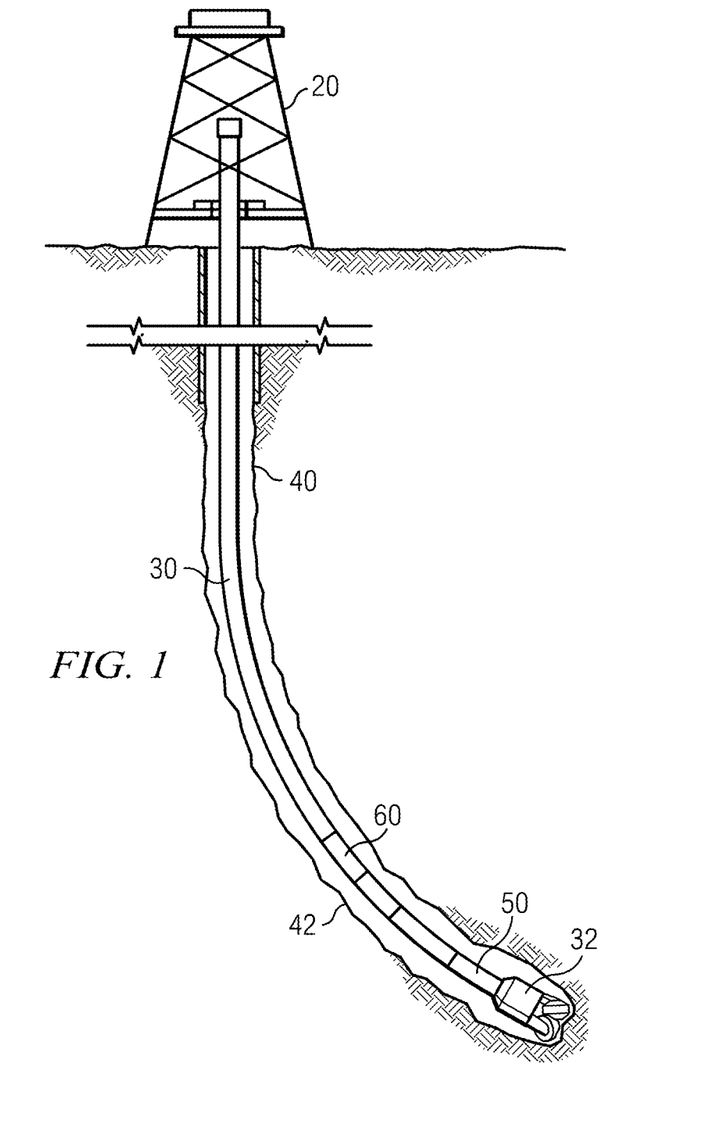
FIG. 1 depicts a drilling rig including a downhole tool configured for measuring DLS.

FIG. 1 depicts an example drilling rig 20 including a downhole tool (such as a steering tool 50 or an MWD tool 60) configured for measuring DLS. The drilling rig 20 may be positioned over a subterranean formation (not shown) and may be configured for drilling a geothermal well or a hydrocarbon exploration and/or production well. The rig 20 may include, for example, a derrick and a hoisting apparatus (also not shown) for raising and lowering a drill string 30, which, as shown, extends into wellbore 40 and includes steering tool 50 and MWD tool 60. The drill string may further include other tools, for example, a mud motor or one or more logging while drilling (LWD) tools. It will be appreciated that the disclosed embodiments are not limited to any particular drill string or bottom hole assembly (BHA) configuration.

The wellbore 40 may be formed in and thereby penetrate subsurface formations by rotary drilling or slide drilling in a manner that is well-known to those of ordinary skill in the art (e.g., via well-known directional drilling techniques). For example, the drill string 30 may be rotated at the surface and/or via a downhole deployed mud motor to drill the well.

A pump may deliver drilling fluid to the interior of the drill string 30 thereby causing the drilling fluid to flow downwardly through the drill string 30. The drilling fluid exits the drill string 30, e.g., via ports in the drill bit 32, and then circulates upwardly through the annulus between the outside of the drill string 30 and the wall of the wellbore 40. In this known manner, the drilling fluid lubricates the drill bit 32 and carries formation cuttings uphole to the surface. The steering tool 50 (e.g., a rotary steerable tool) may be configured to steer (or turn) the direction of drilling to form a curved wellbore section, for example, as depicted at 42. The amount of curvature may be referred to in the industry as the dogleg severity (DLS), which is a measure of the change in direction (inclination and/or azimuth) of the wellbore over a defined length (e.g., in in degrees per 100 feet or 30 meters of length). The DLS is generally defined in the industry as a vector quantity having a magnitude and a direction (the sharpness of the turn and the direction or toolface angle of the turn).

It will be further understood that the disclosed embodiments are not limited to use with an on-shore rig 20 as illustrated on FIG. 1. The disclosed embodiments are equally well suited for use with either onshore or offshore subterranean operations.

Figure 2A:
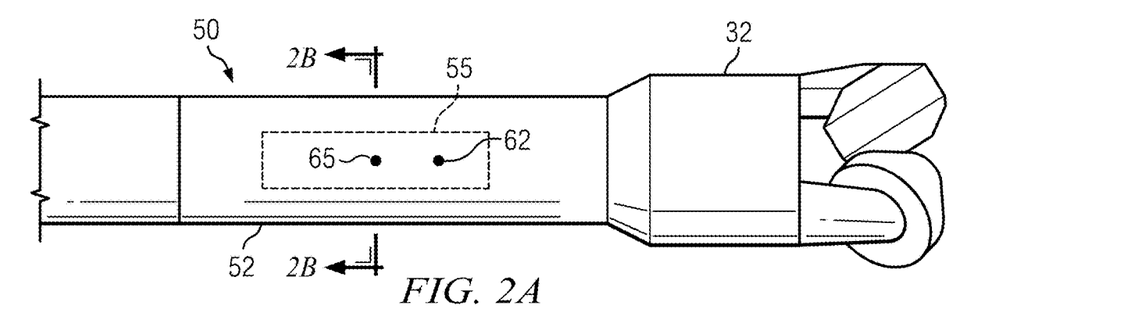
FIGS. 2A and 2B (collectively FIG. 2) depict a lower BHA portion of the drill string (FIG. 1) including the drill bit and an example rotary steerable tool.
Figure 2B:
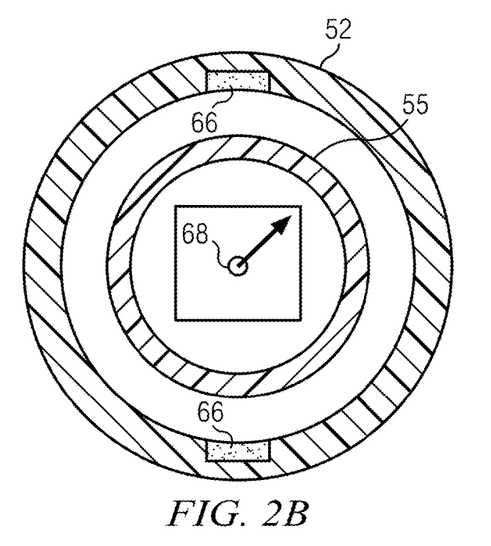

FIGS. 2A and 2B (collectively FIG. 2) depict the lower BHA portion of drill string 30 (FIG. 1) including drill bit 32 and an example rotary steerable tool 50. The rotary steerable tool may include substantially any suitable rotary steerable tool including a roll-stabilized controller (or control unit) deployed in a roll-stabilized housing 55 (or an otherwise substantially non-rotating or geostationary housing). By roll-stabilized it is meant that the sensor housing 55 is substantially non-rotating with the respect to the wellbore (or may at times rotate slowly in comparison to the drill string). For example, various PowerDrive rotary steerable systems (available from SLB) include a drill collar 52 that is intended to fully rotate with the drill string and an internal roll-stabilized control unit 55 that is intended to remain substantially rotationally geostationary (i.e., rotationally stable about the tool axis).

While FIG. 2 depicts a rotary steerable tool 50, it will be understood that the disclosed embodiments are not limited to the use of a rotary steerable tool. For example, with reference again to FIG. 1, drill string 30 may include a measurement while drilling (MWD) tool 60 including a corresponding a roll-stabilized housing including various measurement sensors. As is known to those of ordinary skill in the art, such MWD tools 60 may further include a mud pulse telemetry transmitter or other telemetry system, an alternator for generating electrical power, and an electronic controller. It will thus be appreciated that the disclosed embodiments are not limited to use with a rotary steerable tool.

The example rotary steerable tool 50 depicted (and/or MWD tool 60) may include survey or navigation sensors 62 (such as a tri-axial accelerometer set and a tri-axial magnetometer set) and a rotation rate sensor 65 configured to measure a difference in rotation rates between the roll-stabilized housing 55 and the drill collar 52 (which is equal to the rotation rate of the collar when the roll-stabilized housing is geostationary). As shown on FIG. 2B, the rotation rate sensor may include first and second diametrically opposed magnets 66 deployed on the drill collar 52 and a corresponding cross-axial magnetic field sensor 68 deployed in the roll stabilized housing 55. In example embodiments, the magnetic field sensor 68 may include first and second cross-axial (two axis) magnetic field sensors (e.g., x-axis and y-axis magnetic field sensors as depicted), however, the disclosed embodiments are not limited in this regard. Suitable magnetic field sensors may include, for example, conventional ring core flux gate magnetometers or magnetoresistive sensors.

With continued reference to FIGS. 1 and 2, it will be appreciated that the methods described herein may be configured for implementation via one or more controllers deployed downhole (e.g., in the roll stabilized housing 55 of a rotary steerable tool or an MWD tool). A suitable controller may include, for example, a programmable processor, such as a digital signal processor or other microprocessor or microcontroller and processor-readable or computer-readable program code embodying logic. A suitable processor may be utilized, for example, to execute the method embodiments (or various steps in the method embodiments) described below with respect to FIGS. 3-6 and the corresponding mathematical equations. A suitable controller may also optionally include other controllable components, such as sensors (e.g., a temperature sensor), data storage devices, power supplies, timers, and the like. The controller may also be disposed to be in electronic communication with the accelerometers and magnetometers. A suitable controller may also optionally communicate with other instruments in the drill string, such as, for example, telemetry systems that communicate with the surface. A suitable controller may further optionally include volatile or non-volatile memory or a data storage device.

Figure 3A:
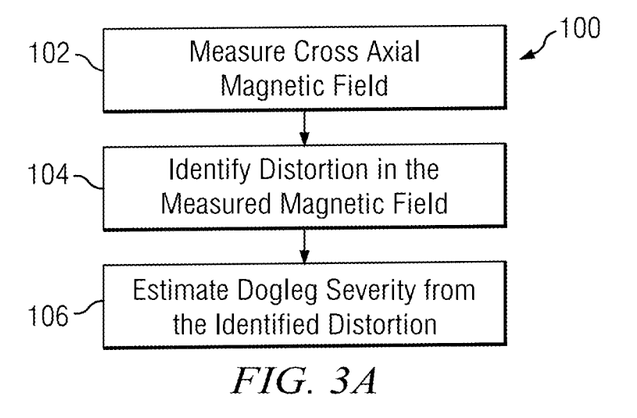
FIGS. 3A and 3B (collectively FIG. 3) depict flow charts of example methods for estimating DLS of a downhole tool deployed in a curved wellbore.
Figure 3B:
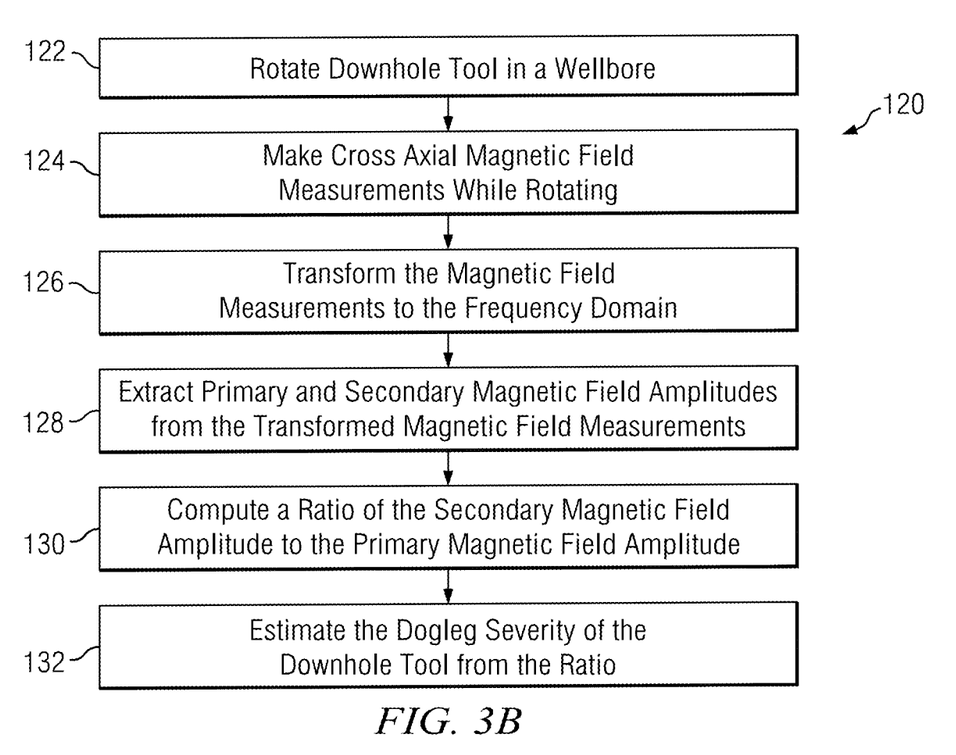

FIGS. 3A and 3B (collectively FIG. 3) depict flow charts of example methods 100 and 120 for estimating a DLS of a downhole tool deployed in a curved wellbore. In FIG. 3A, method 100 includes making cross-axial magnetic field measurements at 102. The magnetic field may emanate from first and second magnets (e.g., first and second diametrically opposed magnets) deployed on a rotating drill collar in the downhole tool. A distortion in the measured magnetic field is identified at 104 and the distortion is evaluated at 106 to estimate the DLS. One aspect of the disclosed embodiments was the realization that the magnetic field emanating from the rotating magnets is not perfectly sinusoidal with the rotational position of the magnets at locations away from the center position of the collar. It was further realized that the distortion (the deviation from a pure sinusoid) tends to increase as the distance between the measurement position and the center point of the collar increases. Moreover, it was still further realized, that in downhole tools including a roll stabilized housing deployed in a rotating collar, that the distance between the measurement position and the center point (which is related to the curvature or DLS of the collar) may be determined from the distortion.

In FIG. 3B, method 120 includes rotating a drill collar about a sensor housing in a curved wellbore at 122. The drill collar includes first and second magnets deployed thereon. The sensor housing may be a roll stabilized housing and may include at least one cross-axial magnetic field sensor deployed therein (e.g., at a center position in the housing). Cross-axial magnetic field measurements are made at 124 while rotating the drill collar in 122. The time based magnetic field measurements may be transformed into the frequency domain at 126. Primary and secondary magnetic field amplitudes may be extracted from the transformed magnetic field measurements at 128. A ratio of the secondary magnetic field amplitude to the primary magnetic field amplitude may be computed at 130 and evaluated at 132 to estimate the DLS of the collar in the curved wellbore.

Figure 4A:
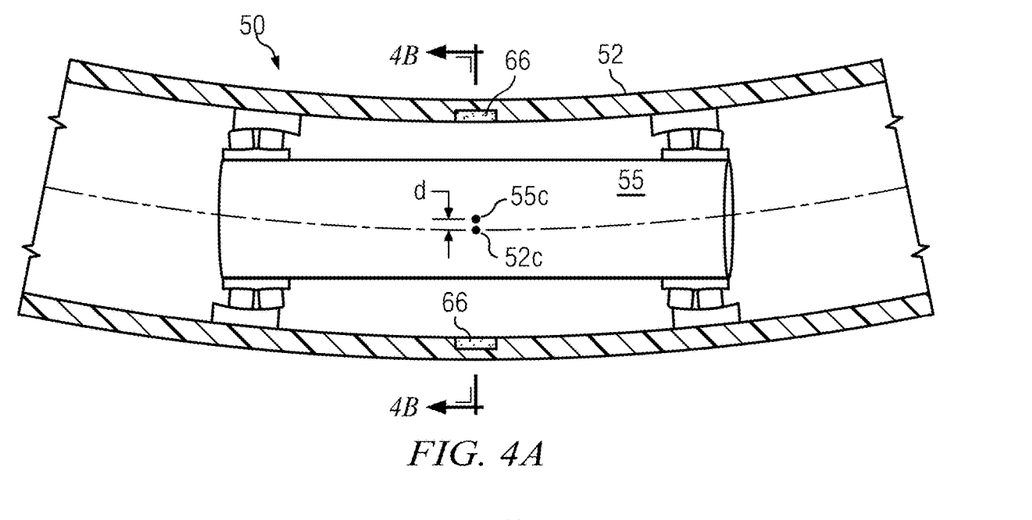
FIGS. 4A and 4B (collectively FIG. 4) schematically depict an example downhole tool undergoing uniform bending or curvature (e.g., in a curved wellbore)
Figure 4B:
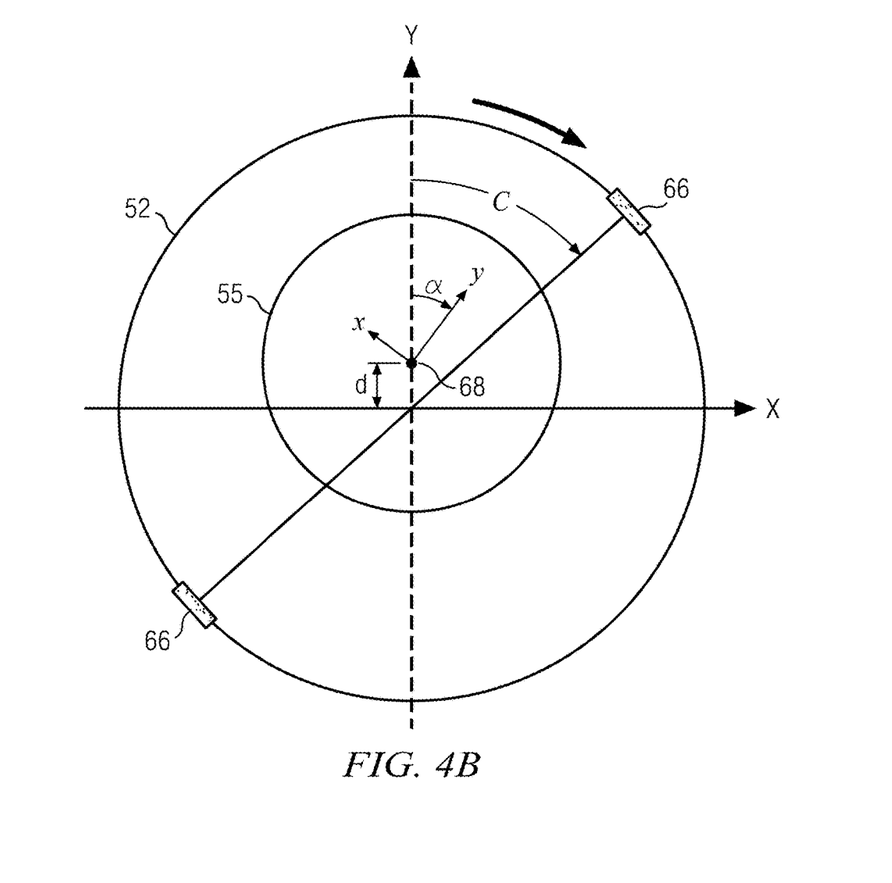

FIGS. 4A and 4B (collectively FIG. 4) schematically depict an example downhole tool 50 undergoing uniform bending or curvature. The magnitude of this bending or curvature is commonly referred to in the industry as a DLS as noted above and is often specified in units of degrees per unit length. In FIG. 4A the downhole tool 50 includes a drill collar 52 and a roll stabilized housing 55, for example, as described above with respect to FIG. 2. The axial ends of the roll stabilized housing 55 may be coupled to the collar 52, for example, via bearings such that the housing 55 is rotationally decoupled from (able to rotate independently about the tool axis with respect to) the tool collar 52. It will, of course, be understood that the depiction is merely an example schematic and that the disclosed method embodiments are not limited to any particular roll-stabilizing mechanism or configuration. Notwithstanding, while the collar 52 may undergo uniform bending, the roll stabilized housing 55 tends not to bend (or tends to bend less than the collar). As a result, the center position 55c of the roll stabilized housing 55 may be radially offset from the center position 52c of the collar 52 as depicted. Moreover, increasing the curvature (DLS) of the collar may correspondingly increase the distance 'd' between the center positions 52c and 55c.

FIG. 4B depicts an axial cross section of downhole tool 50 illustrating example coordinate details and parameter settings. Note that the first and second magnets 66 may be diametrically opposed to one another (circumferentially spaced by about 180 degrees) and may be rotationally offset from the arbitrary x- and y-axes by angle c as the collar rotates. The magnetic field sensor may optionally include first and second cross-axial magnetic field sensors 68 (shown as x- and y-axes sensors) that are radially offset from the origin (the center position 52c of the collar 52) by a distance d and rotationally offset from the x- and y-axes (which define the direction of the dogleg or curvature) by the angle $\alpha$. The angle $\alpha$ may be thought of as the direction (angle) between the coordinate system of the roll stabilized housing 55 and the direction of the tool curvature (as indicated by the y-axis in FIG. 4B) and therefore defines the direction of or heading of the DLS. It will be appreciated that the disclosed embodiments are expressly not limited to the use of first and second cross-axial magnetic field sensors as depicted. In example embodiments a single cross-axial magnetic field sensor (or a single magnetic field sensor having a cross-axial component) may be utilized if it is located at the center position 55c of the roll stabilized housing 55.

With continued reference to FIG. 4, the magnetic field B(r) created by the first and second magnets can be described as the sum of their individual fields $B_1(r)$ and $B_2(r)$, for example, as follows:

$$B(r) = B_1(r) + B_2(r) \tag{1}$$

where $$B_1(r) = \frac{\mu_0}{4\pi} \frac{3\hat{r}_1(\hat{r}_1 \cdot m) - m}{|r - r_1|}, \quad \hat{r}_1 = \frac{(r - r_1)}{|r - r_1|} \tag{2}$$

$$B_2(r) = \frac{\mu_0}{4\pi} \frac{3\hat{r}_2(\hat{r}_2 \cdot m) - m}{|r - r_2|}, \quad \hat{r}_2 = \frac{(r - r_2)}{|r - r_2|} \tag{3}$$

As depicted in FIG. 4B, the two axis magnetic field sensor 68 is located a distance d from the center position between the magnets and rotated by an angle $\alpha$ from the coordinate axes. The corresponding positions $r_1$ and $r_2$ and moments $m_1$ and $m_2$ of the first and second magnets may be expressed, for example, as follows:

$$r_1 = \begin{pmatrix} R \sin c \\ R \cos c \\ 0 \end{pmatrix}, \quad m_1 = \begin{pmatrix} \sin c \\ \cos c \\ 0 \end{pmatrix} \tag{4}$$

$$r_2 = -\begin{pmatrix} R \sin c \\ R \cos c \\ 0 \end{pmatrix}, \quad m_2 = \begin{pmatrix} \sin c \\ \cos c \\ 0 \end{pmatrix} \tag{5}$$

The corresponding positions $r_x$ and $r_y$ and sensing axes $s_x$ and $s_y$ of the x- and y-axis magnetic field sensors may be expressed, for example, as follows:

$$r_x = \begin{pmatrix} 0 \\ d \\ 0 \end{pmatrix}, \quad s_x = \begin{pmatrix} -\cos \alpha \\ \sin \alpha \\ 0 \end{pmatrix} \tag{6}$$

$$r_y = \begin{pmatrix} 0 \\ d \\ 0 \end{pmatrix}, \quad s_y = \begin{pmatrix} \sin \alpha \\ \cos \alpha \\ 0 \end{pmatrix} \tag{7}$$

The sensor readings (the magnetic field measurements) $b_x$ and $b_y$ at the x- and y-axis magnetic field sensors may be expressed, for example, as follows:

$$b_x = s_x^T B(r_x) = s_x^T (B_1(r_x) + B_2(r_x)) \tag{8}$$

$$b_y = s_y^T B(r_y) = s_y^T (B_1(r_y) + B_2(r_y)) \tag{9}$$

Introducing the sensor definitions given above into the equations for $b_x$ and $b_y$ yields a large number of complex terms, however, effective Taylor expansion yields the following first order approximation for $b_x$ ($b_y$ may be similarly approximated):

$$b_x \sim -\frac{\mu_0}{8\pi R^4} \left( -16R^2 \sin(\alpha - c) + 9d^2 \sin(\alpha - 3c) \right) \tag{10}$$

Note again that c represents the angular orientation of the rotating collar magnets 66 and that angle c changes as the collar rotates. The angle $\alpha$ remains substantially constant when the housing 55 is roll stabilized (nonrotating). The above equation indicates that the magnetic field measurements will vary sinusoidally in time (as the collar rotates) with a primary sinusoidal signal having the same frequency as the collar rotate rate (RPM) and an amplitude proportional to the square of the collar radius ($R^2$). The equation further indicates that the primary sinusoidal signal is distorted (not perfectly sinusoidal) and that this distortion can be approximated with a secondary sinusoidal signal having a frequency three times that of the collar rotation rate and an amplitude that is proportional to $d^2$. Also note, that the amplitude of both the primary and secondary sinusoidal signals are independent of the sensor direction (angle $\alpha$), i.e., independent of the rotational position of the roll stabilized housing with respect to the coordinate system.

The amplitudes of the primary and secondary sinusoidal signals may be determined using substantially any suitable mathematical techniques, for example, via transforming the magnetic field measurements into a frequency domain such as via a Fast Fourier Transform (FFT). The amplitudes of the primary and secondary sinusoidal signals may be extracted and evaluated to compute the distance d, which is in turn related to the DLS magnitude of the collar. In example embodiments, the ratio of the secondary signal magnitude to the primary signal magnitude may be evaluated and used to compute the distance d as follows:

$$p = \frac{a_2}{a_1} = \frac{9d^2}{16R^2} \tag{11}$$

$$d = k\sqrt{p} \tag{12}$$

where $a_2$ represents the amplitude of the secondary sinusoidal signal, $a_1$ represents the amplitude of the primary sinusoidal signal, p represents the ratio, and k is a geometric constant related to the radius R of the collar.

With continued reference to FIGS. 3 and 4, it will be appreciated that estimating the DLS from the distortion may further include estimating a direction or heading of the DLS (e.g., the angle α in the roll stabilized housing coordinate system) in addition to the magnitude of the DLS (the distance d as described above). For example, with respect to FIG. 3B, method 120 may further optionally include extracting a first phase of the primary sinusoidal signal and a second phase of the secondary sinusoidal signal from the transformed magnetic field measurements. The DLS direction (angle α) may then be estimated from the first and second extracted phases. For example, introducing the rotating collar angle c=ωt+φ into Eq. (10) yields the following (where ¢ represents an arbitrary or unknown phase):

$$b_x \sim -\frac{\mu_0}{8\pi R^4}\left(16R^2\sin(\omega t + \phi - \alpha) + 9d^2\sin(3\omega t + 3\phi - \alpha)\right) \tag{13}$$

The extracted first phase $\phi_\omega$ of the primary sinusoidal signal and the extracted second phase $\phi_{3w}$ of the secondary sinusoidal signal may be expressed, for example, as follows:

$$\phi_\omega = \phi - \alpha \tag{14}$$

$$\phi_{3\omega} = 3\phi - \alpha \tag{15}$$

Solving Eqs. (14) and (15) simultaneously yields an estimated DLS direction, for example, as follows:

$$\alpha = \frac{\phi_{3\omega} - 3\phi_\omega}{2} \tag{16}$$

It will be appreciated that in practice the cross-axial magnetic field sensors may not be located at the center position 55c of the roll stabilized housing 55'. Moreover, the first and second cross-axial magnetic field sensors are not necessarily collocated (i.e., not located at the same position in the housing).

Figure 5:
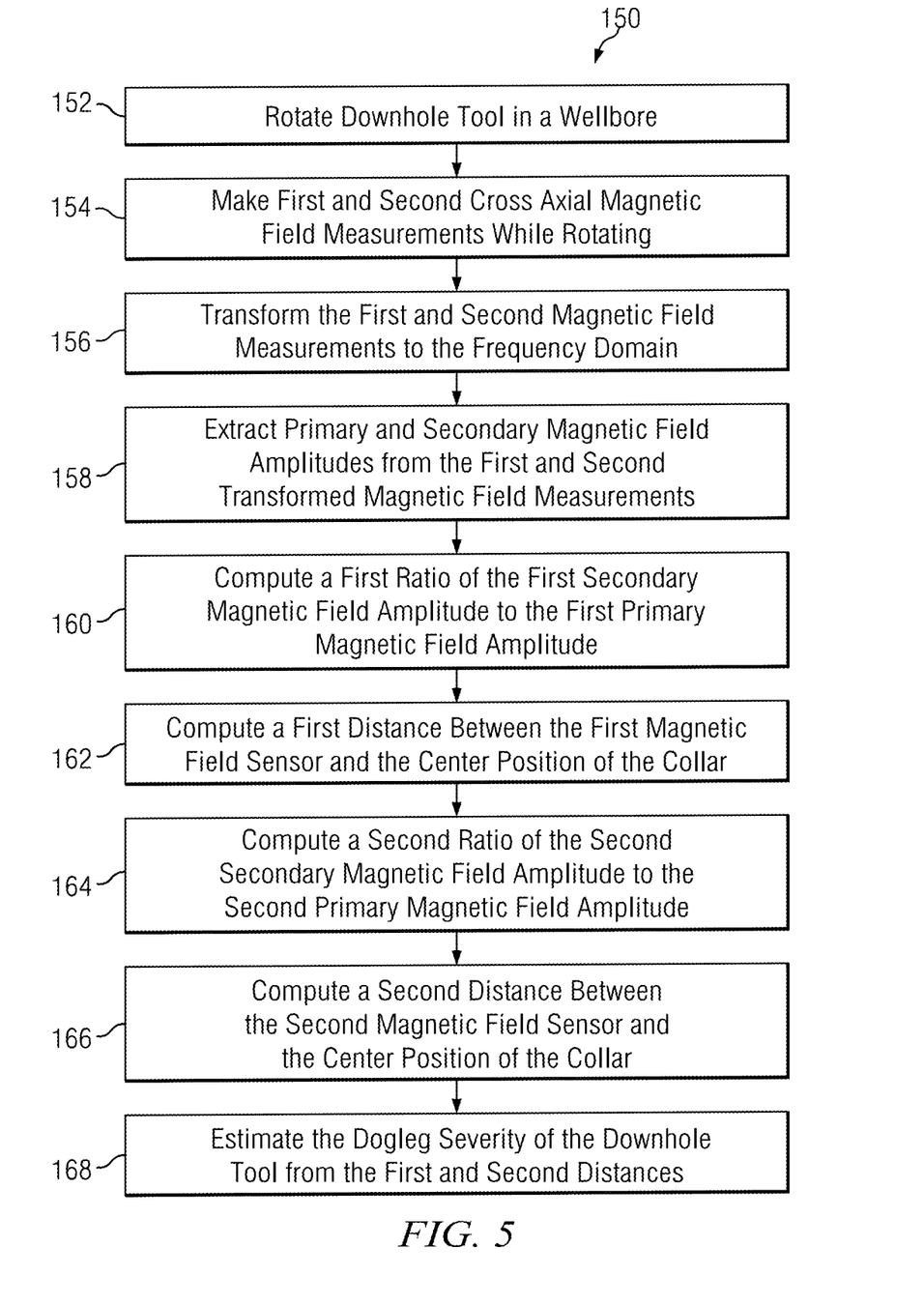
FIG. 5 depicts a flow chart of another example method for estimating DLS of a downhole tool deployed in a curved wellbore.

FIG. 5 depicts a flow chart of an example method 150 for estimating DLS when the magnetic field sensors are off-center and non-collocated in the roll stabilized housing. Method 150 includes rotating a drill collar about a sensor housing in a curved wellbore at 152. As described above, the drill collar includes at least first and second magnets deployed thereon. The sensor housing may be a roll stabilized housing and includes first and second cross-axial magnetic field sensors (e.g., x-axis and y-axis sensors) deployed therein. As described in more detail below, the first and second sensors may be non-collocated and may be deployed along a common radius (or diameter) in the roll stabilized housing. The first and second magnetic field sensors are used to make corresponding cross-axial magnetic field measurements at 154 while rotating the drill collar in 152. Both sets of measurements may be transformed into the frequency domain at 156. Primary and secondary magnetic field amplitudes may be extracted from each of the transformed magnetic field measurements (the measurements made by each of the sensors) at 158. A first ratio of the secondary magnetic field amplitude to the primary magnetic field amplitude extracted from the first magnetic field measurements may be computed at 160 and evaluated at 162 to estimate a first distance between the first magnetic field sensor and a center position of the collar. A second ratio of the secondary magnetic field amplitude to the primary magnetic field amplitude extracted from the second magnetic field measurements may be computed at 164 and evaluated at 166 to estimate a second distance between the second magnetic field sensor and a center position of the collar. The DLS may be estimated at 168 from the first and second distances (for example, by computing a distance between the center position of the roll stabilized housing and the center position of the collar).

Figures 6A, 6B, 6C:
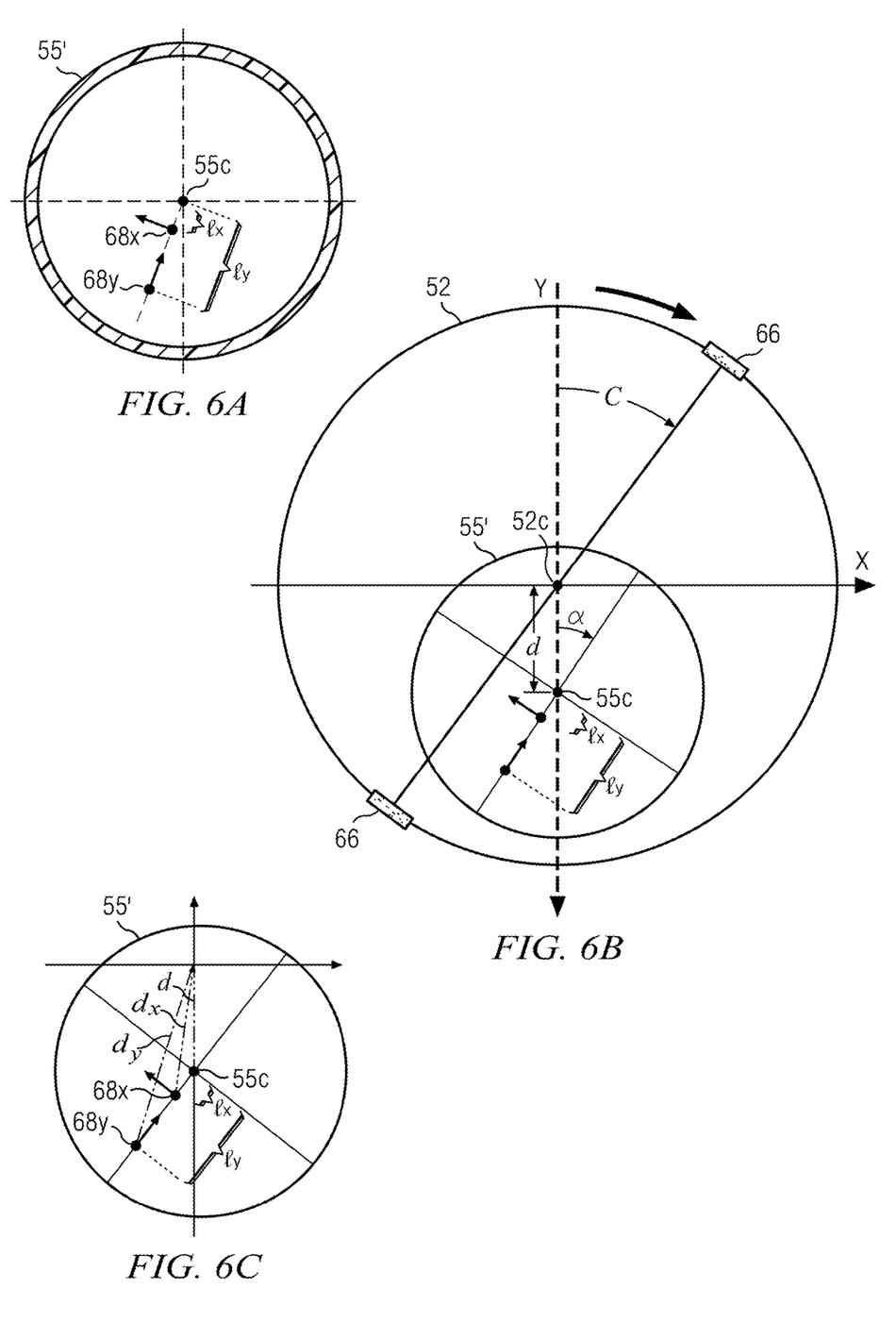
FIGS. 6A, 6B, and 6C (collectively FIG. 6) depict axial cross sections of an example roll stabilized housing including first and second cross-axial (x- and y-axis) magnetic field sensors.

FIGS. 6A-6C (collectively FIG. 6) depict axial cross sections of an example roll stabilized housing 55' including first and second cross-axial (x- and y-axis) magnetic field sensors 68x and 68y. In the example embodiment shown on FIG. 6A, the first and second cross-axial magnetic field sensors 68x and 68y are deployed along a common radius (or diameter) of the housing 55'. The x-axis sensor 68x is located a distance $l_x$ from the center position 55c and the y-axis sensor 68y is located a distance $l_y$ from the center position 55c.

FIG. 6B depicts an axial cross section of a downhole tool 50' including roll stabilized housing 55' and is similar to FIG. 4B in that it illustrates example coordinate details and parameter settings. As previously described, the first and second magnets 66 are diametrically opposed from one another and are rotationally offset from the arbitrary x- and y-axes by angle c (as the collar rotates about the housing 55'). The center position 55c of the housing 55' is radially offset from the center position 52c of the collar 52 by a distance d (owing to the collar bending). The magnetic field sensors 68x and 68y are rotationally offset from the x- and y-coordinate axes by the angle α. Note again that the magnetic field sensors 68x and 68y are offset from the center position 55c of the housing 55' by $l_x$ and $l_y$, respectively and are deployed on a common radius.

FIG. 6C depicts another axial cross-section of roll stabilized housing 55' indicating the distances $d_x$ and $d_y$ of the magnetic field sensors 68x and 68y from the center position 52c of the collar 52. Based on geometric considerations, the offset distance d between the center positions 55c and 52c may be expressed, for example, as follows:

$$d = \sqrt{l_x\left(l_y + \frac{d_x^2 - d_y^2}{l_y - l_x}\right) + d_x^2} \tag{17}$$

Note that the distance d is related to the locations $l_x$ and $l_y$ of the sensors 68x and 68y in the housing (the distances of the sensors from the center position 55c of the housing 55') and the distances $d_x$ and $d_y$ of the of the magnetic field sensors 68x and 68y from the center position 52c of the collar 52. The distances $d_x$ and $d_y$ may be computed from ratios of the amplitudes of the secondary sinusoidal signals to the amplitudes of the primary sinusoidal signals measured at each of the magnetic field sensors 68x and 68y as described above, for example, as follows:

$$p_x = \frac{a_{x2}}{a_{x1}} \tag{18}$$

-continued $$p_y = \frac{a_{y2}}{a_{y1}} \quad (19)$$

where $p_x$ and $p_y$ represented the ratios, $a_{x1}$ and $a_{x2}$ represent the primary and secondary sinusoidal amplitudes at magnetic field sensor 68x, and $a_{y1}$ and $a_{y2}$ represent the primary and secondary sinusoidal amplitudes at magnetic field sensor 68y. The distances $d_x$ and $d_y$ may be computed from the ratios, for example as follows:

$$d_x = k\sqrt{p_x} \quad (20)$$

$$d_y = k\sqrt{p_y} \quad (21)$$

With continued reference to FIGS. 5 and 6, estimating the DLS may further include estimating a DLS magnitude (the distance d as described above) and a DLS direction (e.g., the angle α in the roll stabilized housing coordinate system). The DLS direction may be estimated as described above by extracting a first phase of the primary sinusoidal signal and a second phase of the secondary sinusoidal signal from the transformed magnetic field measurements (at either or both of the x-axis or y-axis sensors). The DLS direction (angle α) may then be estimated from the first and second extracted phases as described above with respect to Eqs. (13)-(16). In example embodiments, the DLS direction may be estimated using both the transformed x-axis and y-axis sensor measurements and may be taken, for example, as an average of the two measurements.

In another embodiment, the angle α may be estimated from the distances d, $d_x$ and/or $d_y$, for example, using the law of cosines as follows:

$$d_y^2 = l_y^2 + d^2 - 2l_y \cdot d \cdot \cos(180 - a) \quad (22)$$

$$d_x^2 = l_x^2 + d^2 - 2l_x \cdot d \cdot \cos(180 - a) \quad (23)$$

Again, the estimated DLS direction may be an average value taken from each of the sensor measurements.

It will be appreciated that the distance d is related to the radius of curvature (the magnitude of the DLS) of the collar and that the radius of curvature may be estimated from the distance d based on the geometry of the collar and the roll stabilized housing. For example, the radius of curvature $R_{curvature}$ may be expressed as follows:

$$R_{curvature} \cong \frac{l^2}{8d} \quad (24)$$

where l represents the length of the roll stabilized housing.

Figure 7A:
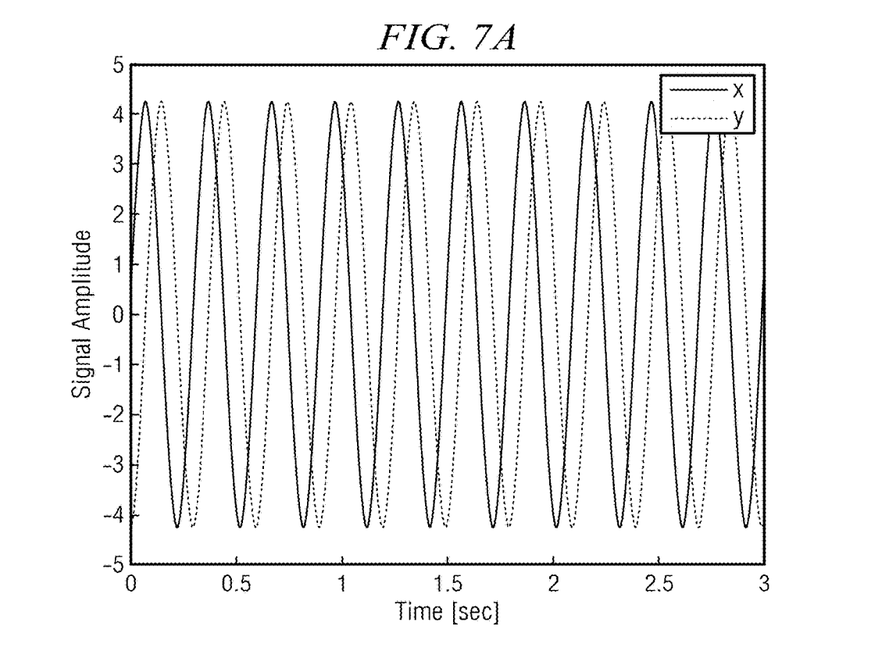
FIGS. 7A and 7B depict example plots of x- and y-axis magnetic field measurements with respect to time (7A) and the logarithm of spectrum amplitude versus frequency obtained by transforming the x- and y-axis magnetic field measurement to the frequency domain (7B).

The disclosed embodiments are now illustrated via the following non-limiting example. FIG. 7A depicts an example plot of x- and y-axis magnetic field measurements with respect to time as measured by magnetic field sensors 68x and 68y. Note that the x- and y-axis magnetic field measurements are approximately sinusoidal with a frequency of about 3.5 Hz indicating a collar rotation rate of about 210 rpm.

Figure 7B:
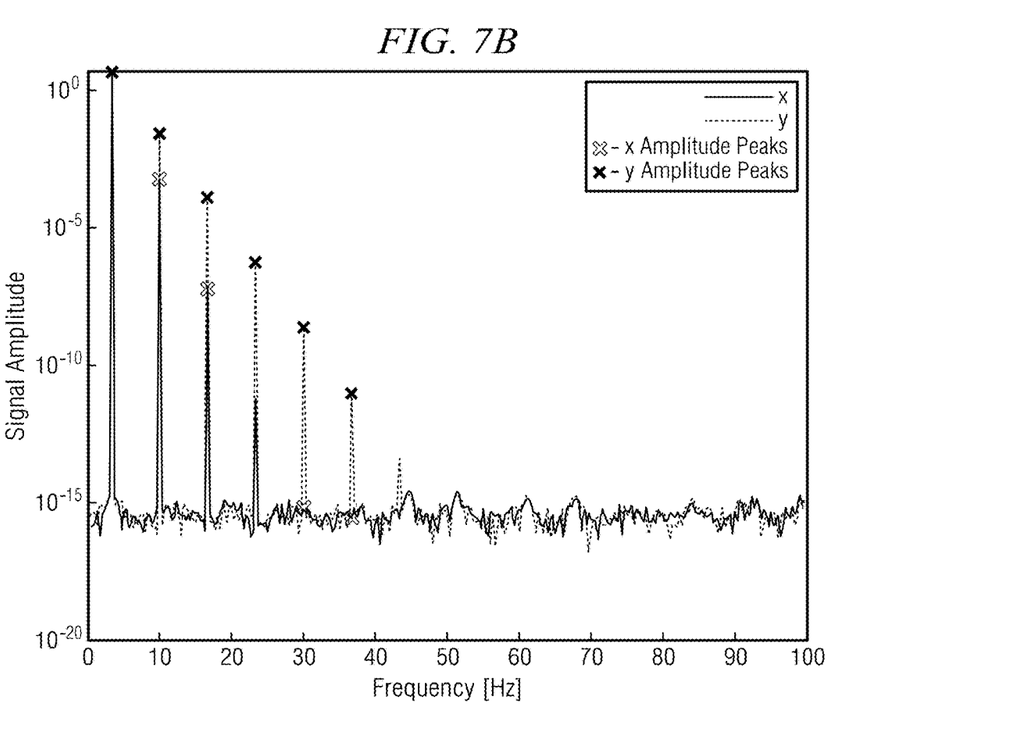

FIG. 7B depicts a plot of the logarithm of spectrum amplitude versus frequency obtained by transforming the magnetic field measurements depicted in FIG. 7A into the frequency domain. In this particular example, the magnetic field measurements were transferred using FFT. As depicted, the spectrum includes a plurality of peaks; first (or primary) peaks at the rotational frequency of the drill collar, a second (or secondary) peaks at three times the rotational frequency of the drill collar, third peaks at five times the rotational frequency of the drill collar, and so on. The primary and secondary peaks were described above with respect to the Taylor expansion of the magnetic field measurements. The x- and y-axis amplitudes are shown in the plot with an open x symbol indicating the x-axis sensor amplitude peaks and a closed x symbol indicating the y-axis sensor amplitude peaks. A DLS magnitude estimate may be determined based on the collar diameter, collar rotation rate, and the distances of the x-axis and y-axis sensors from the center of the roll stabilized housing. A direction estimate may be determined from extracted phases of the primary and secondary sinusoidal signals as described above.

It will be understood that the present disclosure includes numerous embodiments. These embodiments include, but are not limited to, the following embodiments.

In a first embodiment, a method for estimating dogleg severity comprises rotating a downhole tool in a wellbore, the downhole tool including a roll stabilized sensor housing deployed in a rotating collar, the sensor housing including a magnetic field sensor deployed therein, the collar including at least first and second magnets deployed thereon; using the magnetic field sensor to make cross-axial magnetic field measurements while rotating; identifying a distortion in the magnetic field measurements; and estimating the dogleg severity from the distortion in the magnetic field measurements.

A second embodiment may include the first embodiment, wherein the drill collar includes first and second diametrically opposed magnets deployed thereon.

A third embodiment may include any one of the first through second embodiments, wherein the distortion is a deviation from a pure sinusoidal signal; and the estimating the dogleg severity includes estimating at least a magnitude of the dogleg severity.

A fourth embodiment may include any one of the first through third embodiments, wherein identifying the distortion further comprises transforming the magnetic field measurements to a frequency domain; identifying a first peak in the transformed magnetic field measurements at a frequency equal to a rotational frequency of the rotating collar; and identifying a second peak in the transformed magnetic field measurements at a frequency equal to three times the rotational frequency of the rotating collar.

A fifth embodiment may include the fourth embodiment, wherein the estimating the dogleg severity further comprises computing a ratio of an amplitude of the second peak to an amplitude of the first peak; and estimating a distance between a center position of the roll stabilized housing and a center position of the collar from the ratio.

A sixth embodiment may include the fifth embodiment, further comprising estimating a radius of curvature of the drill collar from the estimated distance between the center position of the roll stabilized housing and the center position of the collar.

A seventh embodiment may include any one of the fourth through sixth embodiments, wherein the estimating the dogleg severity further comprises extracting a first phase of a primary sinusoidal signal corresponding to the first peak; extracting a second phase of a secondary sinusoidal signal corresponding to the second peak; and estimating a direction of the dogleg severity from the first and second extracted phases.

An eighth embodiment may include any one of the first through seventh embodiments, wherein the magnetic field sensor comprises first and second magnetic field sensors; the first and second magnetic field sensors are non-collocated and offset from a center position of the roll stabilized housing; and using the magnetic field sensor comprises using the first and second magnetic field sensors to make corresponding first and second cross-axial magnetic field measurements while rotating.

A ninth embodiment may include the eighth embodiment, wherein identifying the distortion further comprises transforming the first and second magnetic field measurements to a frequency domain; and identifying first peaks and second peaks in each of the first and second transformed magnetic field measurements, wherein the first peaks are at a frequency equal to a rotational frequency of the rotating collar and the second peaks are at a frequency equal to three times the rotational frequency of the rotating collar.

A tenth embodiment may include the ninth embodiment, wherein estimating the dogleg severity further comprises computing first and second ratios of amplitudes of the second peaks to amplitudes of the first peaks identified in the corresponding first and second transformed magnetic field measurements; computing a first distance between the first magnetic field sensor and a center position of the collar from the first ratio and a second distance between the second magnetic field sensor and a center position of the collar from the second ratio; and estimating a magnitude of the dogleg severity by estimating a distance between the center position of the roll stabilized housing and the center position of the collar from the first and second distances.

In an eleventh embodiment a downhole tool comprises a roll-stabilized housing deployed in a drill collar, the drill collar configured to rotate with a drill string in a wellbore, the roll-stabilized housing configured to be substantially nonrotating with respect to the wellbore while drilling, first and second magnets deployed on the drill collar; a magnetic field sensor deployed in the roll-stabilized housing and configured to measure a cross-axial magnetic field emanating from by the first and second magnets; and a processor configured to: cause the magnetic field sensor to make cross-axial magnetic field measurements while the drill collar rotates in the wellbore; identify a distortion in the magnetic field measurements; and estimate a dogleg severity of the drill collar from the distortion in the magnetic field measurements.

A twelfth embodiment may include the eleventh embodiment, wherein the downhole tool comprises a rotary steerable tool.

A thirteenth embodiment may include any one of the eleventh through twelfth embodiments, wherein the processor is configured to identify the distortion via transforming the magnetic field measurements to a frequency domain; extracting a first amplitude of a first peak in the transformed magnetic field measurements, the first peak at a frequency equal to a rotational frequency of the rotating collar; and extracting a second amplitude of a second peak in the transformed magnetic field measurements, the second peak at a frequency equal to three times the rotational frequency of the rotating collar; and the processor is configured to estimate the dogleg severity of the drill collar via computing a ratio of the second amplitude to the first amplitude; and estimating a distance between a center position of the roll stabilized housing and a center position of the collar from the ratio.

A fourteenth embodiment may include any one of the eleventh through thirteenth embodiments, wherein the processor is further configured to: extract a first phase of a primary sinusoidal signal corresponding to the first peak; extract a second phase of a secondary sinusoidal signal corresponding to the second peak; and estimate a direction of the dogleg severity from the first and second extracted phases.

A fifteenth embodiment may include any one of the eleventh through fourteenth embodiments, wherein the magnetic field sensor comprises first and second magnetic field sensors that are non-collocated and offset from a center position of the roll stabilized housing; and the processor is further configured to: cause the first and second magnetic field sensors to make corresponding first and second cross-axial magnetic field measurements while rotating; transform the first and second magnetic field measurements to the frequency domain; identify first peaks and second peaks in each of the first and second transformed magnetic field measurements, wherein the first peaks are at a frequency equal to a rotational frequency of the rotating collar and the second peaks are at a frequency equal to three times the rotational frequency of the rotating collar; compute first and second ratios of amplitudes of the second peaks to amplitudes of the first peaks; compute a first distance between the first magnetic field sensor and a center position of the collar from the first ratio and a second distance between the second magnetic field sensor and a center position of the collar from the second ratio; and estimate a magnitude of the dogleg severity by estimating a distance between the center position of the roll stabilized housing and the center position of the collar from the first and second distances.

In a sixteenth embodiment a method for estimating dogleg severity comprises rotating a downhole tool in a wellbore, the downhole tool including a roll stabilized sensor housing deployed in a rotating collar, the sensor housing including a magnetic field sensor deployed therein, the collar including at least first and second magnets deployed thereon; using the magnetic field sensor to make cross-axial magnetic field measurements while rotating; transforming the magnetic field measurements to a frequency domain; extracting a first amplitude of a first peak in the transformed magnetic field measurements, the first peak at a frequency equal to a rotational frequency of the rotating collar; extracting a second amplitude of a second peak in the transformed magnetic field measurements, the second peak at a frequency equal to three times the rotational frequency of the rotating collar; computing a ratio of the second amplitude to the first amplitude; and estimating a distance between a center position of the roll stabilized housing and a center position of the collar from the ratio.

A seventeenth embodiment may include the sixteenth embodiment, further comprising estimating a radius of curvature of the drill collar from the estimated distance between the center position of the roll stabilized housing and the center position of the collar.

An eighteenth embodiment may include any one of the sixteenth through seventeenth embodiments, further comprising extracting a first phase of a primary sinusoidal signal corresponding to the first peak; extracting a second phase of a secondary sinusoidal signal corresponding to the second peak; and estimating a direction of the dogleg severity from the first and second extracted phases.

A nineteenth embodiment may include any one of the sixteenth through eighteenth embodiments, wherein the magnetic field sensor comprises first and second magnetic field sensors that are non-collocated and offset from a center position of the roll stabilized housing, the method further comprising estimating a first distance between the first magnetic field sensor and the center position of the collar from the magnetic field measurements made using the first magnetic field sensor; estimating a second distance between the second magnetic field sensor in the center position of the collar from the magnetic field measurements made using the second magnetic field sensor; and estimating the distance between a center position of the roll stabilized housing and a center position of the collar from the first distance and the second distance.

A twentieth embodiment may include the nineteenth embodiment, wherein the estimating the first distance comprises computing a first ratio of the second amplitude to the first amplitude of corresponding second and first peaks in the transformed magnetic field measurements made with the first magnetic field sensor; and the estimating the second distance comprises computing a second ratio of the second amplitude to the first amplitude of corresponding second and first peaks in the transformed magnetic field measurements made with the second magnetic field sensor.

Although dogleg severity estimation via collar magnetic field measurements has been described in detail, it should be understood that various changes, substitutions and alternations can be made herein without departing from the spirit and scope of the disclosure as defined by the appended claims.

What is claimed is:

1. A method for estimating dogleg severity comprising:
rotating a downhole tool in a wellbore, the downhole tool including a roll stabilized sensor housing deployed in a rotating collar, the sensor housing including a magnetic field sensor deployed therein, the collar including at least first and second magnets deployed thereon;
using the magnetic field sensor to make cross-axial magnetic field measurements while rotating;
identifying a distortion in the magnetic field measurements; and
estimating the dogleg severity from the distortion in the magnetic field measurements.

2. The method of claim 1, wherein the drill collar includes first and second diametrically opposed magnets deployed thereon.

3. The method of claim 1, wherein:
the distortion is a deviation from a pure sinusoidal signal; and
the estimating the dogleg severity includes estimating at least a magnitude of the dogleg severity.

4. The method of claim 1, wherein identifying the distortion further comprises:
transforming the magnetic field measurements to a frequency domain;
identifying a first peak in the transformed magnetic field measurements at a frequency equal to a rotational frequency of the rotating collar; and
identifying a second peak in the transformed magnetic field measurements at a frequency equal to three times the rotational frequency of the rotating collar.

5. The method of claim 4, wherein the estimating the dogleg severity further comprises:
computing a ratio of an amplitude of the second peak to an amplitude of the first peak; and
estimating a distance between a center position of the roll stabilized housing and a center position of the collar from the ratio.

6. The method of claim 5, further comprising:
estimating a radius of curvature of the drill collar from the estimated distance between the center position of the roll stabilized housing and the center position of the collar.

7. The method of claim 4, wherein the estimating the dogleg severity further comprises:
extracting a first phase of a primary sinusoidal signal corresponding to the first peak;
extracting a second phase of a secondary sinusoidal signal corresponding to the second peak; and
estimating a direction of the dogleg severity from the first and second extracted phases.

8. The method of claim 1, wherein:
the magnetic field sensor comprises first and second magnetic field sensors;
the first and second magnetic field sensors are non-collocated and offset from a center position of the roll stabilized housing; and
using the magnetic field sensor comprises using the first and second magnetic field sensors to make corresponding first and second cross-axial magnetic field measurements while rotating.

9. The method of claim 8, wherein identifying the distortion further comprises:
transforming the first and second magnetic field measurements to a frequency domain; and
identifying first peaks and second peaks in each of the first and second transformed magnetic field measurements, wherein the first peaks are at a frequency equal to a rotational frequency of the rotating collar and the second peaks are at a frequency equal to three times the rotational frequency of the rotating collar.

10. The method of claim 9, wherein estimating the dogleg severity further comprises:
computing first and second ratios of amplitudes of the second peaks to amplitudes of the first peaks identified in the corresponding first and second transformed magnetic field measurements;
computing a first distance between the first magnetic field sensor and a center position of the collar from the first ratio and a second distance between the second magnetic field sensor and a center position of the collar from the second ratio; and
estimating a magnitude of the dogleg severity by estimating a distance between the center position of the roll stabilized housing and the center position of the collar from the first and second distances.

11. A downhole tool comprising:
a roll-stabilized housing deployed in a drill collar, the drill collar configured to rotate with a drill string in a wellbore, the roll-stabilized housing configured to be substantially nonrotating with respect to the wellbore while drilling, first and second magnets deployed on the drill collar;
a magnetic field sensor deployed in the roll-stabilized housing and configured to measure a cross-axial magnetic field emanating from the first and second magnets; and
a processor configured to:
cause the magnetic field sensor to make cross-axial magnetic field measurements while the drill collar rotates in the wellbore;
identify a distortion in the magnetic field measurements; and
estimate a dogleg severity of the drill collar from the distortion in the magnetic field measurements.

12. The downhole tool of claim 11, wherein the downhole tool comprises a rotary steerable tool.

13. The downhole tool of claim 11, wherein:
the processor is configured to identify the distortion via transforming the magnetic field measurements to a frequency domain; extracting a first amplitude of a first peak in the transformed magnetic field measurements, the first peak at a frequency equal to a rotational frequency of the rotating collar; and extracting a second amplitude of a second peak in the transformed magnetic field measurements, the second peak at a frequency equal to three times the rotational frequency of the rotating collar; and the processor is configured to estimate the dogleg severity of the drill collar via computing a ratio of the second amplitude to the first amplitude; and estimating a distance between a center position of the roll stabilized housing and a center position of the collar from the ratio.

14. The downhole tool of claim 13, wherein the processor is further configured to:
extract a first phase of a primary sinusoidal signal corresponding to the first peak;
extract a second phase of a secondary sinusoidal signal corresponding to the second peak; and
estimate a direction of the dogleg severity from the first and second extracted phases.

15. The downhole tool of claim 11, wherein:
the magnetic field sensor comprises first and second magnetic field sensors that are non-collocated and offset from a center position of the roll stabilized housing; and
the processor is further configured to:
cause the first and second magnetic field sensors to make corresponding first and second cross-axial magnetic field measurements while rotating;
transform the first and second magnetic field measurements to the frequency domain;
identify first peaks and second peaks in each of the first and second transformed magnetic field measurements, wherein the first peaks are at a frequency equal to a rotational frequency of the rotating collar and the second peaks are at a frequency equal to three times the rotational frequency of the rotating collar;
compute first and second ratios of amplitudes of the second peaks to amplitudes of the first peaks;
compute a first distance between the first magnetic field sensor and a center position of the collar from the first ratio and a second distance between the second magnetic field sensor and a center position of the collar from the second ratio; and
estimate a magnitude of the dogleg severity by estimating a distance between the center position of the roll stabilized housing and the center position of the collar from the first and second distances.

16. A method for estimating dogleg severity comprising:
rotating a downhole tool in a wellbore, the downhole tool including a roll stabilized sensor housing deployed in a rotating collar, the sensor housing including a magnetic field sensor deployed therein, the collar including at least first and second magnets deployed thereon;
using the magnetic field sensor to make cross-axial magnetic field measurements while rotating;
transforming the magnetic field measurements to a frequency domain;
extracting a first amplitude of a first peak in the transformed magnetic field measurements, the first peak at a frequency equal to a rotational frequency of the rotating collar;
extracting a second amplitude of a second peak in the transformed magnetic field measurements, the second peak at a frequency equal to three times the rotational frequency of the rotating collar;
computing a ratio of the second amplitude to the first amplitude; and
estimating a distance between a center position of the roll stabilized housing and a center position of the collar from the ratio.

17. The method of claim 16, further comprising estimating a radius of curvature of the drill collar from the estimated distance between the center position of the roll stabilized housing and the center position of the collar.

18. The method of claim 16, further comprising:
extracting a first phase of a primary sinusoidal signal corresponding to the first peak;
extracting a second phase of a secondary sinusoidal signal corresponding to the second peak; and
estimating a direction of the dogleg severity from the first and second extracted phases.

19. The method of claim 16, wherein the magnetic field sensor comprises first and second magnetic field sensors that are non-collocated and offset from a center position of the roll stabilized housing, the method further comprising:
estimating a first distance between the first magnetic field sensor and the center position of the collar from the magnetic field measurements made using the first magnetic field sensor;
estimating a second distance between the second magnetic field sensor in the center position of the collar from the magnetic field measurements made using the second magnetic field sensor; and
estimating the distance between a center position of the roll stabilized housing and a center position of the collar from the first distance and the second distance.

20. The method of claim 19, wherein:
the estimating the first distance comprises computing a first ratio of the second amplitude to the first amplitude of corresponding second and first peaks in the transformed magnetic field measurements made with the first magnetic field sensor, and
the estimating the second distance comprises computing a second ratio of the second amplitude to the first amplitude of corresponding second and first peaks in the transformed magnetic field measurements made with the second magnetic field sensor.

\* \* \* \* \*